US011972328B2

(12) United States Patent
Ahn

(10) Patent No.: US 11,972,328 B2
(45) Date of Patent: Apr. 30, 2024

(54) MACHINE LEARNING DEVICE AND MACHINE LEARNING SYSTEM USING THE SAME

(71) Applicant: SK hynix Inc., Gyeonggi-do (KR)

(72) Inventor: Nam Young Ahn, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1214 days.

(21) Appl. No.: 16/216,054

(22) Filed: Dec. 11, 2018

(65) Prior Publication Data
US 2019/0362261 A1 Nov. 28, 2019

(30) Foreign Application Priority Data

May 25, 2018 (KR) .......................... 10-2018-0059754

(51) Int. Cl.
*G06N 20/00* (2019.01)
*G06F 3/06* (2006.01)

(52) U.S. Cl.
CPC ........... *G06N 20/00* (2019.01); *G06F 3/0604* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| 6,028,447 A | 2/2000 | Andrews et al. |
| 2008/0130156 A1 | 6/2008 | Chu et al. |
| 2017/0102950 A1 | 4/2017 | Chamberlain et al. |
| 2017/0169358 A1* | 6/2017 | Choi ....................... G06N 20/00 |
| 2017/0262231 A1* | 9/2017 | Koishi .................. G11C 16/26 |
| 2018/0025268 A1 | 1/2018 | Teig et al. |
| 2018/0046541 A1* | 2/2018 | Niu ..................... G06F 11/1068 |
| 2019/0114533 A1* | 4/2019 | Ng ........................... G06N 3/04 |

(Continued)

FOREIGN PATENT DOCUMENTS

| JP | H6-347563 A | 12/1994 |
| JP | H06347563 A * | 12/1994 |

(Continued)

OTHER PUBLICATIONS

English Translation of JP-H06347563-A (Year: 1993).*

(Continued)

*Primary Examiner* — Farley Abad
*Assistant Examiner* — Dayton Lewis-Taylor
(74) *Attorney, Agent, or Firm* — IP & T GROUP LLP

(57) ABSTRACT

A machine learning device including a general-purpose memory module interface is disclosed. The machine learning device includes a data storage circuit configured to store raw data and command data received from a host device through a memory module interface, and store machine learning data as a result of machine learning of the raw data and location data of the machine learning data, a machine learning logic circuit configured to generate the machine learning data through the machine learning of the raw data according to a pre-programmed machine learning logic, and a machine learning controller configured to read the raw data from the data storage circuit based on the command data, transmit the read raw data to the machine learning logic circuit, and write the machine learning data and the location data in the data storage circuit.

19 Claims, 8 Drawing Sheets

(56) References Cited

U.S. PATENT DOCUMENTS

2019/0129834 A1\* 5/2019 Purkayastha .......... G06N 20/00
2019/0205737 A1\* 7/2019 Bleiweiss .............. G06N 20/00

FOREIGN PATENT DOCUMENTS

| JP | H7-036699 A | 2/1995 |
| --- | --- | --- |
| JP | H11-015773 A | 1/1999 |
| JP | 2002-207713 A | 7/2002 |
| JP | 2016126801 A | 7/2016 |
| JP | 2018-028910 A | 2/2018 |
| KR | 1020170063334 | 6/2017 |
| KR | 1020170100416 | 9/2017 |
| KR | 20180019473 A | 2/2018 |
| WO | 2017/171769 A1 | 10/2017 |

OTHER PUBLICATIONS

First Office Action for the Chinese Patent Application No. 201811542512.5 issued by the Chinese Patent Office dated Sep. 5, 2022.
Tommy Tracy II et al., Towards Machine Learning on the Automata Processor, International Conference on High Performance Computing, Jun. 2016.
Office Action for the Korean Patent Application No. 10-2018-0059754 issued by the Korean Patent Office dated Jul. 3, 2023.
Notice of Allowance for Korean Patent Application No. 10-2018-0059754 issued by the Korean Patent Office dated Oct. 6, 2023.
Office Action for the Japanese Patent Application No. 2019-005632 issued by the Japanese Patent Office on Dec. 27, 2022.

\* cited by examiner

MACHINE LEARNING DEVICE AND MACHINE LEARNING SYSTEM USING THE SAME

CROSS-REFERENCE TO RELATED APPLICATION

This application claims priority of Korean patent application No. 10-2018-0059754 filed on 25 May 2018, the disclosure of which is hereby incorporated in its entirety by reference.

BACKGROUND OF THE INVENTION

Various embodiments of the present disclosure generally relate to a machine learning device. Particularly, the embodiments relate to a machine learning device including a general-purpose memory module interface.

A machine learning system is capable of learning through data received from an external part and estimating output data to be acquired from input data based on the learning result.

Conventionally, the machine learning system has been implemented as a dedicated board for machine learning or a USB-type device for machine learning, or as a graphic card based on a Graphics Processing Unit (GPU).

Since machine learning technology has been intensively developed and has rapidly come into widespread use, a wider variety of machine learning devices are in need.

BRIEF SUMMARY OF THE INVENTION

An embodiment of the present disclosure relates to a machine learning device compatible with a conventional computer system through a general-purpose memory module interface.

In accordance with an aspect of the present disclosure, a machine learning device includes a data storage circuit configured to store raw data and command data received from a host device through a memory module interface, and store machine learning data as a result of machine learning of the raw data and location data of the machine learning data, a machine learning logic circuit configured to generate the machine learning data through the machine learning of the raw data according to a pre-programmed machine learning logic, and a machine learning controller configured to read the raw data from the data storage circuit based on the command data, transmit the read raw data to the machine learning logic circuit, and write the machine learning data and the location data in the data storage circuit.

In accordance with another aspect of the present disclosure, a machine learning system includes a host device configured to include one or more processors, and a machine learning device configured to generate machine learning data by performing machine learning of raw data received together with a write command from the host device according to a pre-programmed machine learning logic, and transmit the machine learning data to the host device upon receiving a read command from the host device. The machine learning device includes a plurality of chip pins through which the machine learning device is connectable to a computer motherboard.

In accordance with another aspect of the present disclosure, a machine learning device of a dual inline memory module (DIMM) type includes a data storage circuit configured according to a DIMM standard and configured to store target data and a machine learning command provided according to a DIMM protocol, a machine learning circuit having machine learning logic programmed therein to perform a machine learning operation to the target data to generate machine learning data, and a control circuit configured to control, upon detection of the machine learning command stored in the data storage circuit, the machine learning circuit to perform the machine learning operation by providing the target data from the data storage circuit to the machine learning circuit, and provide the machine learning data to the data storage circuit. The data storage circuit is further configured to store the machine learning data to provide the stored machine learning data in response to a read command provided according to the DIMM protocol.

It is to be understood that both the foregoing general description and the following detailed description of embodiments are exemplary and explanatory.

BRIEF DESCRIPTION OF THE DRAWINGS

The above and other features and advantages of the present disclosure will become readily apparent by reference to the following detailed description when considered in conjunction with the accompanying drawings wherein.

DESCRIPTION OF EMBODIMENTS

Figure 1:
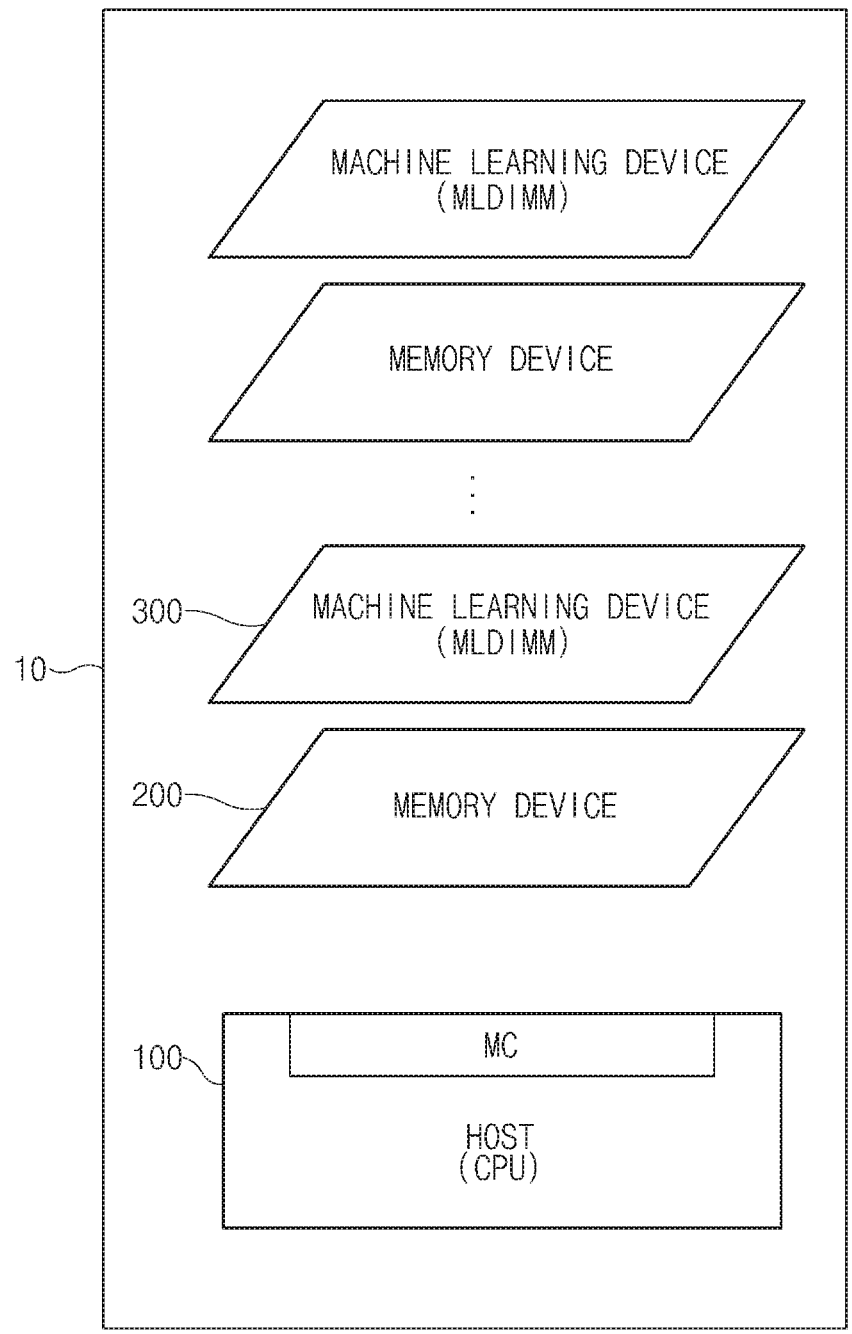
FIG. 1 is a schematic diagram illustrating an example of a machine learning system according to an embodiment of the present disclosure.

References will now be made in detail to embodiments of the present disclosure, examples of which are illustrated in the accompanying drawings. Throughout this disclosure, the same reference numbers will be used in the drawings to refer to the same or like parts. It is noted that reference to "an embodiment" does not necessarily mean only one embodiment, and different references to "an embodiment" are not necessarily to the same embodiment(s).

In association with the embodiments of the present disclosure, specific structural and functional descriptions are disclosed only for illustrative purposes, the embodiments of the present disclosure can be implemented in various ways without departing from the scope or spirit of the present disclosure.

In description of the present disclosure, it will be understood that the terms "first", "second", "third", and so on may be used to describe various components, but the components are not limited by the terms. The terms may be used to distinguish one component from another component. For example, a first component may be called a second component and a second component may be called a first component without departing from the scope of the present disclosure.

The terms used in the present application are merely used to describe specific embodiments and are not intended to limit the present disclosure. Singular forms may include the plural forms as well and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms used herein, including technical or scientific terms, have the same meanings as understood by those skilled in the art. Terms defined in a generally used dictionary may be analyzed to have the same meaning as the context of the relevant art and may not be analyzed to have ideal meaning or excessively formal meaning unless clearly defined in the present application. The terminology used in the present disclosure is for the purpose of describing particular embodiments only and is not intended to limit the disclosure.

FIG. 1 is a schematic diagram illustrating a machine learning system according to an embodiment of the present disclosure.

The machine learning system shown in FIG. 1 may include a host device 100, a memory device 200, and a machine learning device 300.

Referring to FIG. 1, the host device 100 may include an arithmetic operation device, such as a Central Processing Unit (CPU) or a Graphics Processing Unit (GPU), provided with one or more processors.

The host device 100 may receive data, which is required for the arithmetic operation, from the memory device 200, and may store the operation result in the memory device 200. The host device 100 may transmit a command for executing machine learning and data, which is required for the machine learning, to the machine learning device 300, and may receive the result of machine learning from the machine learning device 300. In this case, the host device 100 may communicate with the memory device 200 and the machine learning device 300 through a memory controller (MC) included in the host device 100.

The memory device 200 may store data received from the host device 100 or data to be transmitted to the host device 100, and may assist the arithmetic operation of the host device 100. The memory device 200 may be implemented as any of storage media including a volatile memory. The memory device 200 may be a module based on a Dual In-line Memory Module (DIMM) standard. By way of example and not limitation, the memory device 200 may include an Unbuffered Dual In-line Memory Module (UDIMM), a Registered Dual In-line Memory Module (RDIMM), a Load Reduced Dual In-line Memory Module (LRDIMM), a Non-Volatile Dual In-line Memory Module (NVDIMM), and the like.

The machine learning device 300 may process raw data received together with a write command from the host device 100 according to a pre-programmed machine learning logic, may generate machine learning data according to the processing result of the raw data, and may transmit the machine learning data to the host device 100 in response to a read command from the host device 100. The machine learning device 300 may be implemented as a memory module that includes multiple DRAM chips formed over a circuit board provided with chip pins coupled to a motherboard 10. For example, the machine learning device 300 may be a memory module based on the DIMM standard in the same manner as the memory device 200. That is, the host device 100 may regard the machine learning device 300 as the DIMM in the same manner as in the memory device 200.

In FIG. 1, the host device 100, the memory device 200, and the machine learning device 300 may be implemented to be mounted on the motherboard 10 of a server (not shown), e.g., a server that is installed in a data center.

Figure 2:
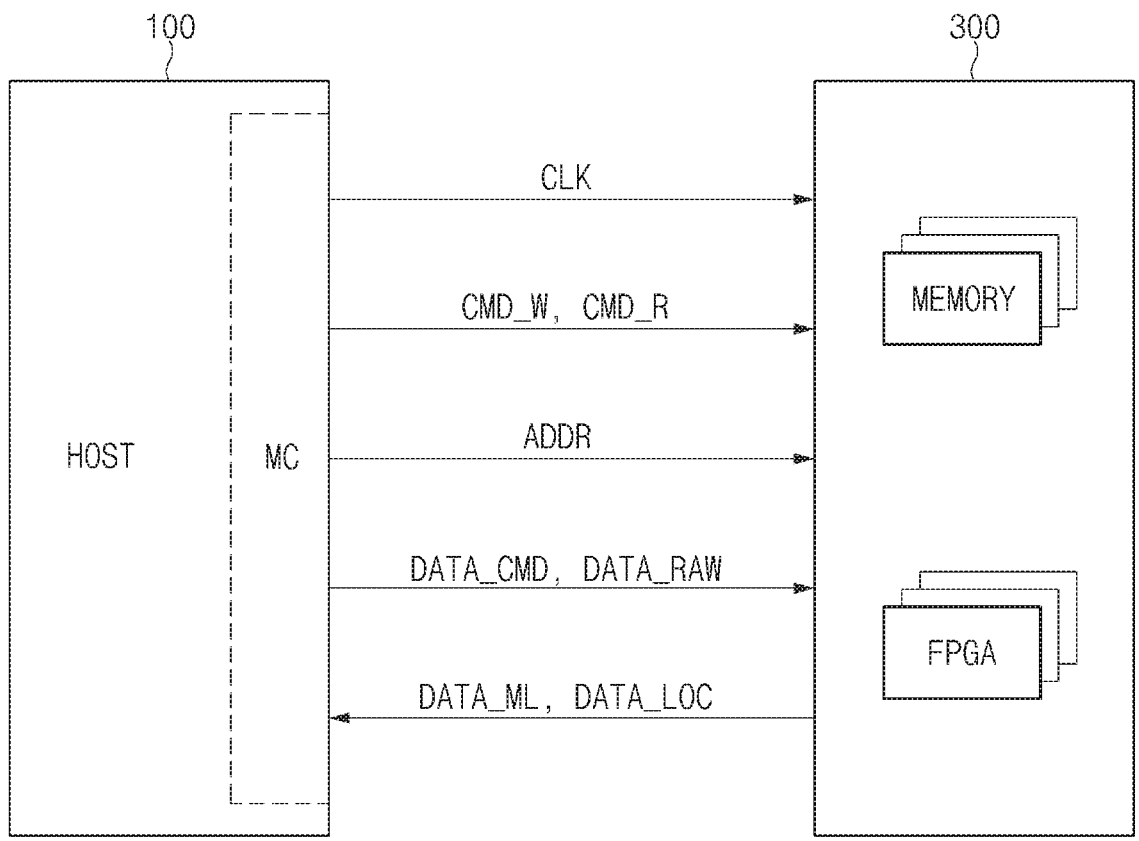
FIG. 2 is a conceptual diagram illustrating an example of the relationship between a host device and a machine learning device shown in FIG. 1.

FIG. 2 is a conceptual diagram illustrating an example of the relationship between the host device 100 and the machine learning device 300 shown in FIG. 1.

Referring to FIG. 2, the host device 100 may transmit data DATA_CMD and DATA_RAW necessary for machine learning to the machine learning device 300 through the memory controller MC when the machine learning is required, and may receive machine learning data DATA_ML as the result of the machine learning from the machine learning device 300. Here, in the same manner as the method for writing in or reading data from the memory device 200, the host device 100 may write in or read data from the machine learning device 300 through a DIMM interface (not shown) and the memory controller (MC). In more detail, the host device 100 may transmit data DATA_CMD and DATA_RAW needed for machine learning to the machine learning device 300 in the same manner as the method for writing data in the memory device 200, and may receive machine learning data DATA_ML from the machine learning device 300 in the same manner as the method for reading data from the memory device 200.

For example, if the host device 100 wants the machine learning device 300 to perform machine learning, the host device 100 may write not only raw data DATA_RAW to be used in machine learning but also command data DATA_CMD in memory elements (for example, DRAMs) of the machine learning device 300 using a write command CMD_W and address information ADDR. Thereafter, the host device 100 may read data stored in the memory elements of the machine learning device 300 using a clock signal CLK, a read command CMD_R, and address information ADDR, such that the host device 100 can receive machine learning data DATA_ML. That is, the host device 100 may regard the machine learning device 300 as a DIMM, such that the host device 100 may write or read data using the machine learning device 300. During reading of the machine learning data DATA_ML, the host device 100 may periodically monitor a specific location of each memory element contained in the machine learning device 300, such that the host device 100 may pre-recognize whether the machine learning data DATA_ML was stored according to the result of periodic monitoring.

The machine learning device 300 may perform machine learning by processing raw data DATA_RAW received from the host device 100 according to a pre-programmed machine learning logic, and may transmit to the host device 100 machine learning data DATA_ML as a result of the machine learning. For example, the machine learning device 300 may perform machine learning using the command data DATA_CMD and the raw data DATA_RAW that have been written in one or more memory elements by the host device 100, and may store in the memory elements resultant data DATA_ML as a result of the machine learning. The machine learning device 300 may include a plurality of Field Programmable Gate Arrays (denoted as "FPGA" in FIG. 2), each of which includes a programmed machine learning logic.

Figure 3:
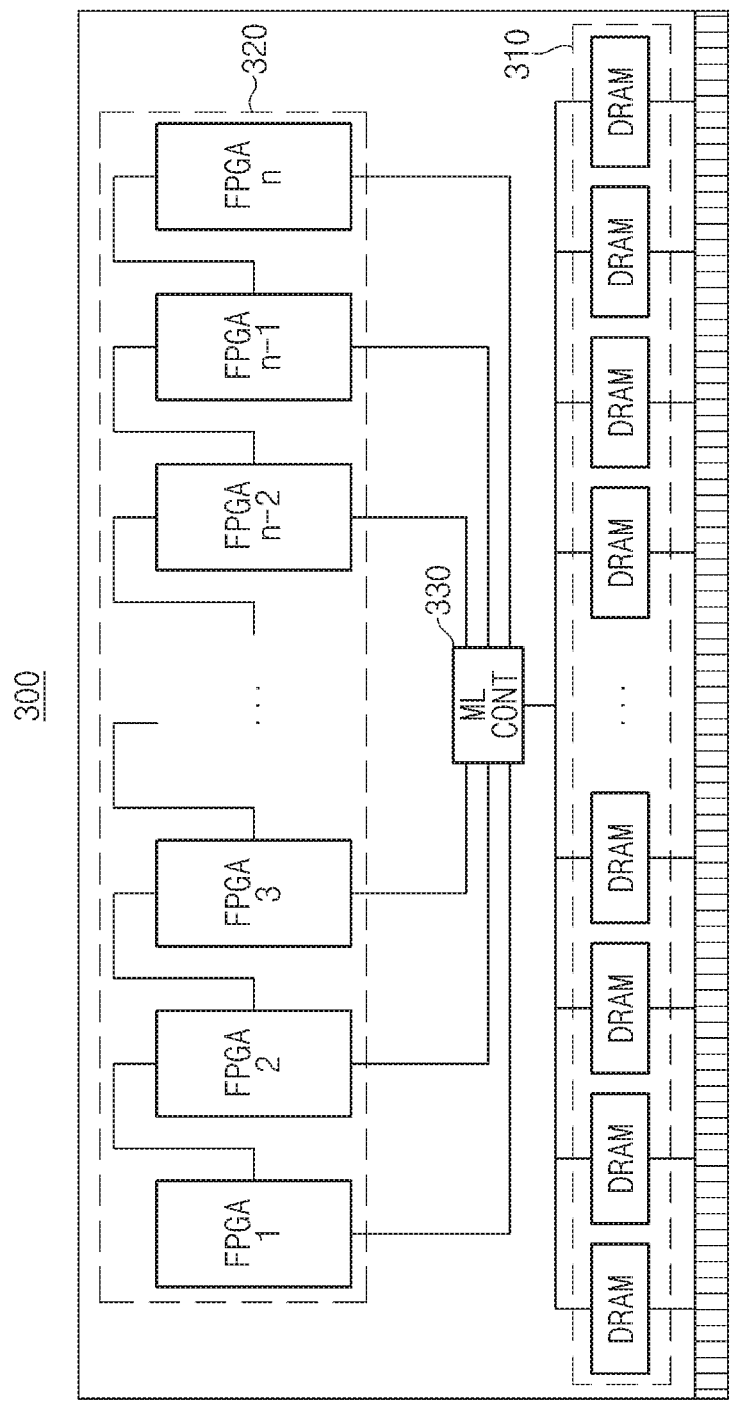
FIG. 3 is a schematic diagram illustrating an example of a machine learning device shown in FIG. 2 according to an embodiment of the present disclosure.

FIG. 3 is a schematic diagram illustrating an example of the machine learning device 300 shown in FIG. 2 according to an embodiment of the present disclosure.

Referring to FIG. 3, the machine learning device 300 may include a data storage circuit 310, a machine learning logic circuit 320, and a machine learning controller 330.

The data storage circuit 310 may store data DATA_CMD and DATA_RAW received from the host device 100, machine learning data DATA_ML generated through the machine learning operation of the machine learning device 300, and location data DATA_LOC indicating a storage location of the machine learning data DATA_ML. The data storage circuit 310 may transmit and receive data to and from the host device 100 using a DIMM interface through signal lines of the motherboard 10 in the same manner as in the related art of the DIMM interface. In addition, the data storage circuit 310 may transmit and receive data to and from the machine learning controller 330 through signal lines of the machine learning device 300.

Figure 4:
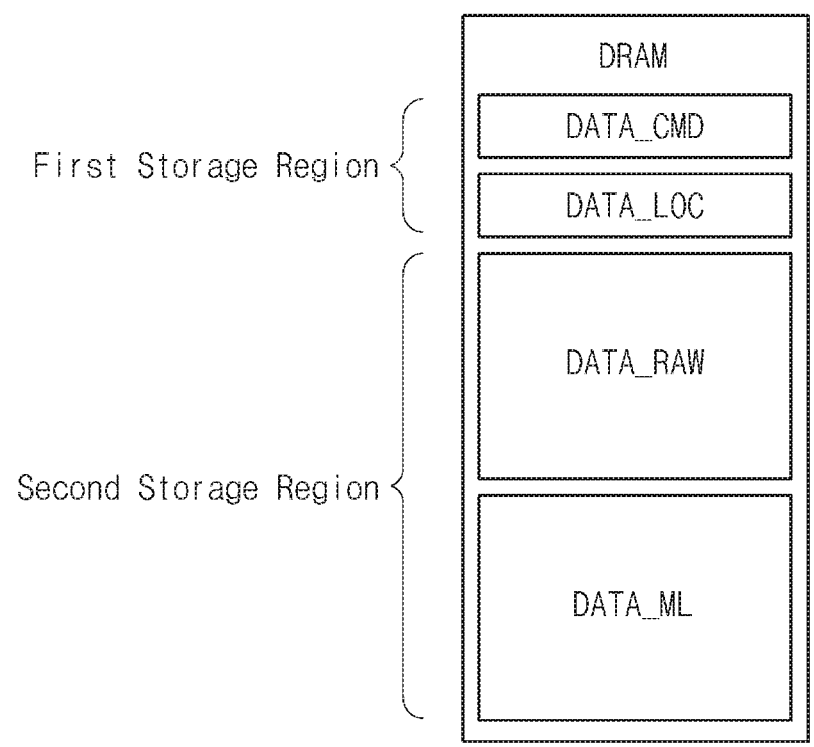
FIG. 4 is a conceptual diagram illustrating that individual data storage regions of a memory element are physically separated from each other.

FIG. 4 is a conceptual diagram illustrating a memory element of the data storage circuit 310.

As shown in FIG. 4, each memory element, e.g., shown as a DRAM in FIG. 3, of the data storage circuit 310 may include a first storage region in which data DATA_CMD and DATA_LOC needed for data communication with the host device 100 are stored, and a second storage region in which data DATA_RAW and DATA_ML are stored as transmission/reception targets. The first storage region and the second storage region may be physically separated from each other.

Therefore, the host device 100 may write command data DATA_CMD at a designated location of memory element, and may access a designated location and read the location data DATA_LOC. Specifically, the storage location (i.e., address) of data DATA_CMD and DATA_LOC needed for communication with the host device 100 may be pre-designated, such that the host device 100 can write command data DATA_CMD by accessing the designated location and can read location data DATA_LOC by accessing the designated location. The memory elements of the data storage circuit 310 may include a plurality of volatile memory elements, for example, DRAMs.

Referring back to FIG. 3, upon receiving raw data DATA_RAW from the machine learning controller 330, the machine learning logic circuit 320 may perform machine learning by processing the raw data DATA_RAW according to the pre-programmed machine learning logic, and may transmit machine learning data DATA_ML to the machine learning controller 330. The machine learning logic circuit 320 may include a plurality of FPGAs FPGA 1 to FPGA n in which the machine learning logic is programmed.

In this case, each of the FPGAs FPGA 1 to FPGA n may perform machine learning by independently receiving raw data DATA_RAW from the machine learning controller 330, and may transmit the machine learning data DATA_ML to the machine learning controller 330. Alternatively, FPGAs FPGA 1 to FPGA n may sequentially perform the machine learning logic. For example, a first FPGA FPGA 1 may perform machine learning based on a pre-programmed logic using the received raw data DATA_RAW, and may transmit resultant data of the machine learning to a second FPGA FPGA 2. The second FPGA FPGA 2 may perform machine learning based on the pre-programmed logic using data processed by the first FPGA FPGA 1, and may transmit data indicating the machine learning result to a third FPGA FPGA 3. In this way, after machine learning is sequentially applied up to the last FPGA FPGA n, the last FPGA FPGA n may transmit the completed machine learning data DATA_ML to the machine learning controller 330.

The machine learning controller 330 may transmit raw data DATA_RAW stored in the data storage circuit 310 to the machine learning logic circuit 320, and may store in the data storage circuit 310 machine learning data DATA_ML as a result of the machine learning of the machine learning logic circuit 320. For example, the machine learning controller 330 may periodically monitor whether the command data DATA_CMD has been stored in a specific location of the data storage circuit 310, may read raw data DATA_RAW from the data storage circuit 310 on the basis of command data DATA_CMD, and may then transmit the read raw data DATA_RAW to the machine learning logic circuit 320.

While the machine learning logic circuit 320 performs machine learning, the machine learning controller 330 may cut off a connection between itself and the data storage circuit 310. After completion of the machine learning, the machine learning controller 330 may receive machine learning data DATA_ML from the machine learning logic circuit 320, and may write the received machine learning data DATA_ML in the data storage circuit 310. Subsequently, the machine learning controller 330 may write at a predetermined location of the data storage circuit 310 location data DATA_LOC indicating the storage location of the machine learning data DATA_ML.

Figure 5:
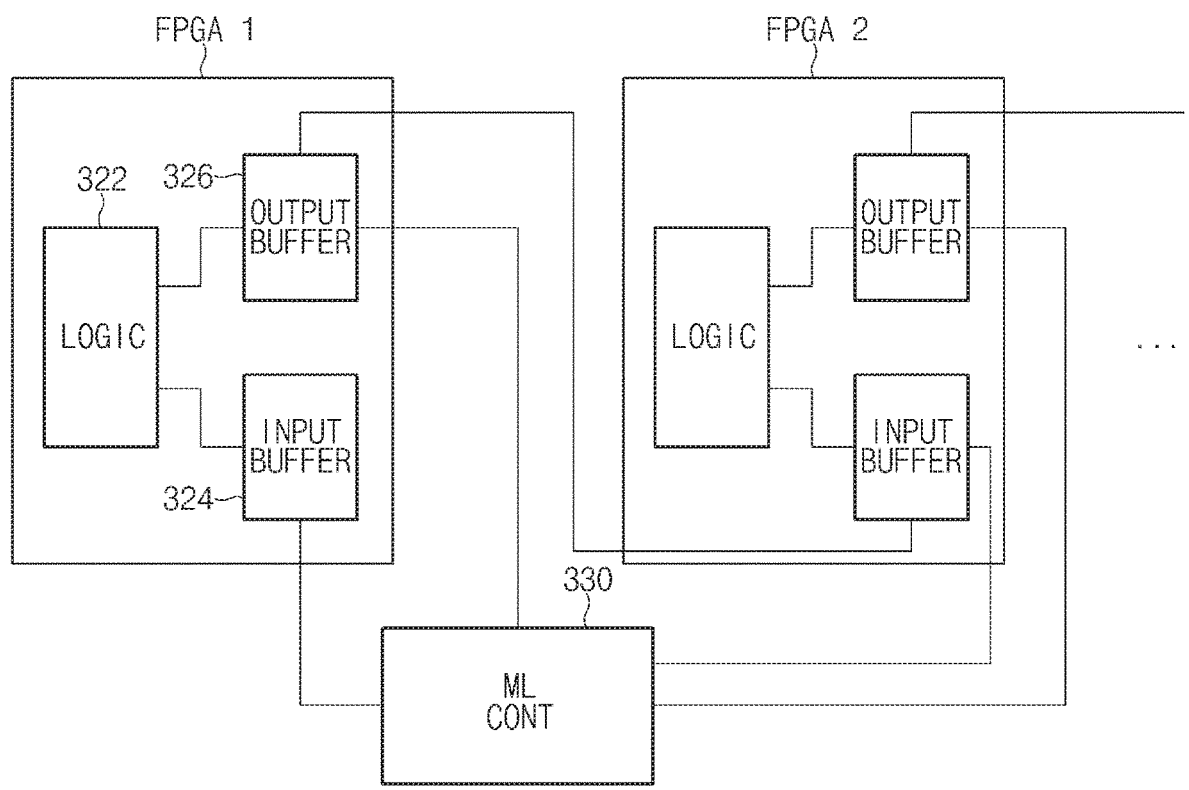
FIG. 5 is a schematic diagram illustrating an example of individual field programmable gate arrays (FPGAs) contained in a machine learning logic circuit shown in FIG. 3.

FIG. 5 is a schematic diagram illustrating an example of individual FPGAs among the plurality of FPGAs FPGA 1 to FPGA n contained in a machine learning logic circuit 320 shown in FIG. 3. For convenience of description and better understanding of the present disclosure, FIG. 5 exemplarily illustrates a structure of two contiguous FPGAs (e.g., the first and second FPGAs FPGA 1 and FPGA 2) and the relationship between the machine learning controller 330 and the two FPGAs (i.e., the first and second FPGAs FPGA 1 and FPGA 2).

Referring to FIG. 5, each FPGA may include a logic circuit 322, an input buffer 324, and an output buffer 326.

The logic circuit 322 may include a programmed machine learning logic, may generate machine learning data DATA_ML by processing raw data DATA_RAW stored in the input buffer 324 according to the programmed machine learning logic, and may transmit the generated machine learning data DATA_ML to the output buffer 326.

The input buffer 324 may be coupled to the machine learning controller 330, and may temporarily store raw data DATA_RAW received from the machine learning controller 330.

The output buffer 324 may be coupled to the machine learning controller 330 or to an input buffer of a subsequent FPGA, and may temporarily store the data DATA_ML processed by the logic circuit 322. The output buffer 324 of the last FPGA FPGA n may be coupled to the machine learning controller 330.

Figure 6:
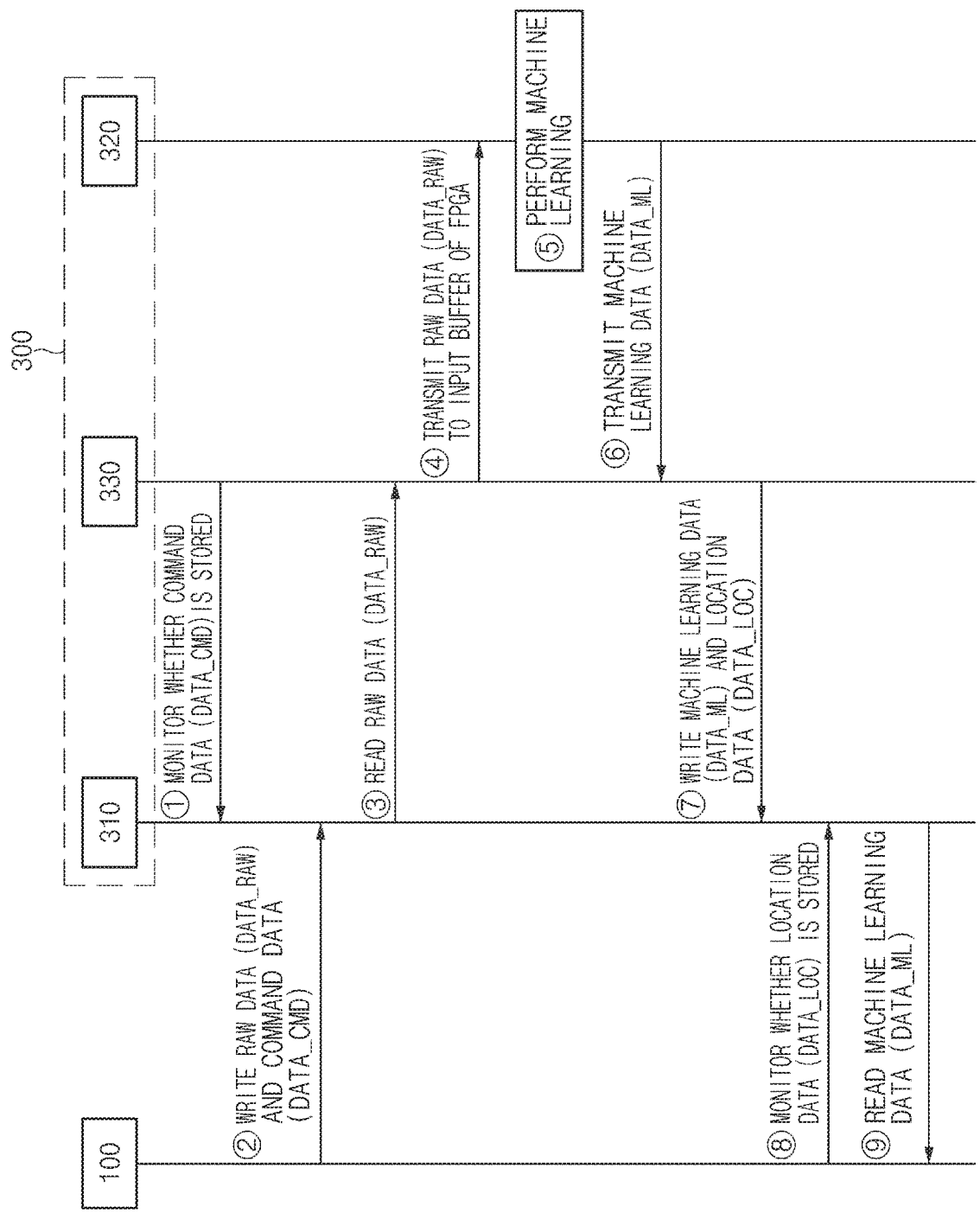
FIG. 6 is a diagram illustrating operations of the host device and the machine learning device according to an embodiment of the present disclosure.

FIG. 6 is a diagram illustrating operations of the host device 100 and the machine learning device 300 according to an embodiment of the present disclosure.

Referring to FIG. 6, the machine learning controller 330 of the machine learning device 300 may periodically access a pre-designated storage location of the data storage circuit 310, and may thus monitor whether command data DATA_CMD from the host device 100 was stored in the pre-designated storage location at step ①.

When machine learning is needed, the host device 100 may access the data storage circuit 310 of the machine learning device 300 through the DIMM interface, may write raw data DATA_RAW into the designated storage location in the data storage circuit 310, and may then write into the designated location command data DATA_CMD including both a command for commanding beginning of the machine learning and information for indicating the storage location of the raw data DATA_RAW at step ②.

When the host device 100 writes the command data DATA_CMD and the raw data DATA_RAW, the machine learning controller 330 may recognize the presence of the command data DATA_CMD stored in the data storage circuit 310 through periodical monitoring shown in step ①.

The machine learning controller 330 that has confirmed the presence of the command data DATA_CMD stored in the data storage circuit 310 may access the storage location indicated by the command data DATA_CMD, and may read the raw data DATA_RAW at step ③.

Subsequently, the machine learning controller 330 may transmit the read raw data DATA_RAW to the input buffer 324 of the machine learning logic circuit 320 at step ④.

The machine learning logic circuit 320 may perform the machine learning operation by processing the received raw data DATA_RAW according to the pre-programmed machine learning logic at step ⑤.

In this case, each of the FPGAs FPGA 1 to FPGA n of the machine learning logic circuit 320 may independently process the raw data DATA_RAW received from the machine learning controller 330, and may then transmit the machine learning data DATA_ML to the machine learning controller 330.

If it is impossible to perform machine learning using only one FPGA due to a large-sized machine learning program, FPGAs FPGA 1 to FPGA n may sequentially perform machine learning. For example, the first FPGA FPGA 1 may perform machine learning based on the pre-programmed logic using the received raw data DATA_RAW, and may transmit resultant data of the machine learning to the second FPGA FPGA 2. The second FPGA FPGA 2 may perform machine learning based on the pre-programmed logic using data received from the first FPGA FPGA 1 or data received from the first FPGA FPGA 1 and data of the input buffer 324 of the second FPGA FPGA 2, and may transmit data indicating the machine learning result to the third FPGA FPGA 3. In this way, machine learning can be sequentially applied up to the last FPGA FPGA n.

Machine learning data DATA_ML, as a result of completion of machine learning, may be transmitted to the machine learning controller 330 at step ⑥.

The machine learning controller 330 may write machine learning data DATA_ML by accessing the data storage circuit 310, and may write location data indicating the storage location of the machine learning data DATA_ML in a pre-designated storage location at step ⑦.

After writing the raw data DATA_RAW, the host device 100 may periodically access the pre-designated storage location of the data storage circuit 310, and may thus monitor the presence or absence of location data DATA_LOC stored in the corresponding location in the data storage circuit 310 at step ⑧.

The host device 100 that has confirmed the presence of location data DATA_LOC stored in the data storage circuit 310 may access a storage location indicated by the location data DATA_LOC, and may thus read the machine learning data DATA_ML at step ⑨.

Figure 7:
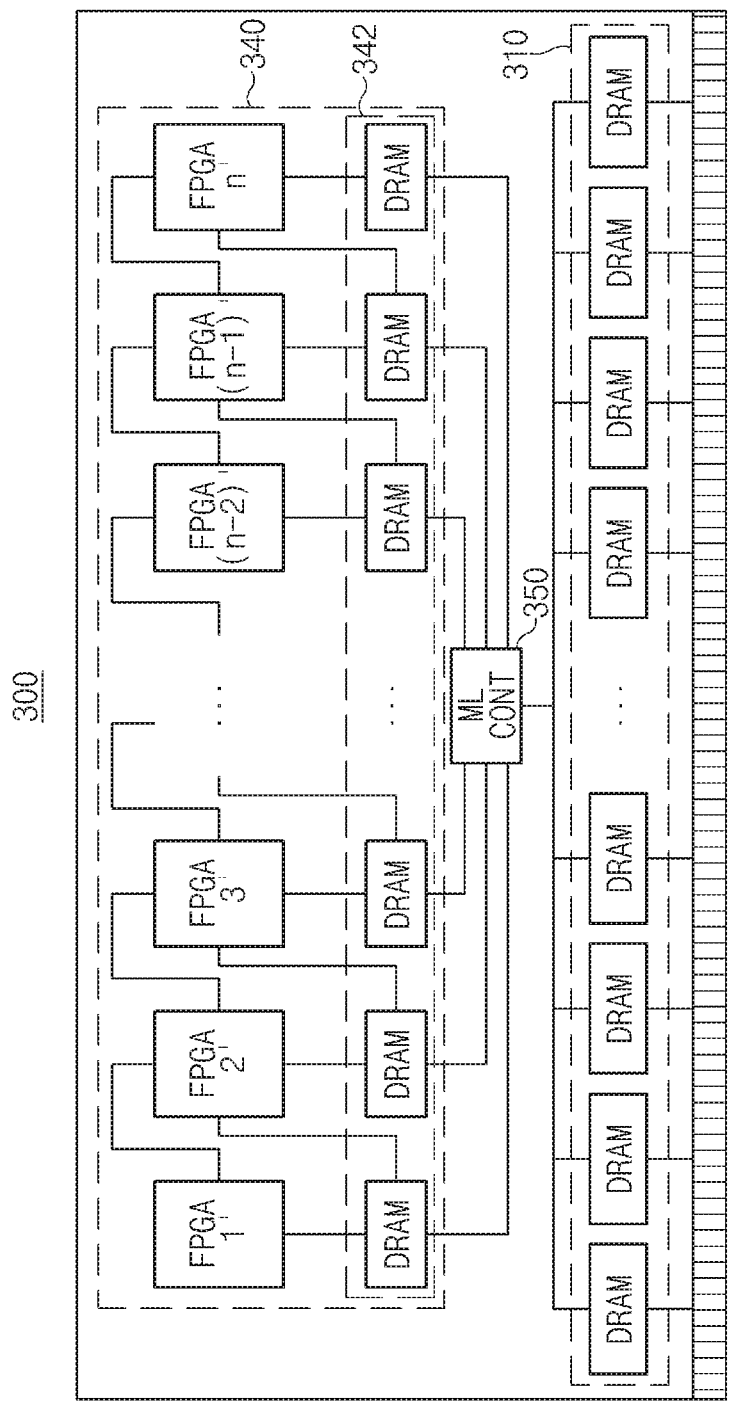
FIG. 7 is a schematic diagram illustrating an example of a machine learning device according to another embodiment of the present disclosure.

FIG. 7 is a schematic diagram illustrating an example of the machine learning device 300 according to an embodiment of the present disclosure.

The machine learning device 300 of FIG. 3 allows each of FPGAs FPGA 1 to FPGA n to include buffers (i.e., the input buffers 324 and the output buffers 326) in the same manner as in FIG. 5, and transmits/receives raw data DATA_RAW and machine learning data DATA_ML to/from the machine learning controller 330 through the buffers 324 and 326.

In contrast, a machine learning logic circuit 340 of the machine learning device 300 shown in FIG. 7 may include memory elements 342 formed outside a plurality of FPGAs FPGA 1' to FPGA n'. That is, the FPGAs FPGA 1' to FPGA n' and the machine learning controller 350 may transmit and receive raw data DATA_RAW and machine learning data DATA_ML through the memory elements 342.

Referring to FIG. 7, the machine learning device 300 may include the data storage circuit 310, the machine learning logic circuit 340, and the machine learning controller 350.

The data storage circuit 310 may be identical in structure and function to the data storage circuit 310 of FIG. 3, and as such a detailed description thereof will herein be omitted for convenience of description.

The machine learning logic circuit 340 may generate machine learning data DATA_ML by processing the raw data DATA_RAW received from the machine learning controller 350 according to a pre-programmed machine learning logic, and may transmit the generated machine learning data DATA_ML to the machine learning controller 350. The machine learning logic circuit 340 may include not only a plurality of FPGAs FPGA 1' to FPGA n' in which the machine learning logic is programmed, but also the plurality of memory elements 342 respectively coupled to the FPGAs FPGA 1' to FPGA n'.

The FPGAs FPGA 1' to FPGA n' may read raw data DATA_RAW stored in the memory elements 342, may process the read raw data DATA_RAW according to the machine learning logic, and may write the machine learning data DATA_ML in the memory elements 342. The machine learning logic of the FPGAs FPGA 1' to FPGA n' may be programmed in the same manner as in the FPGAs FPGA 1 to FPGA n. However, differently from FPGAs FPGA 1 to FPGA n shown in FIG. 3, the FPGAs FPGA 1' to FPGA n' shown in FIG. 7 may not input and output data through internal buffers thereof, and may input and output data by writing the data in the external memory elements 342 or reading the stored data from the memory elements 342.

Each of the FPGAs FPGA 1' to FPGA n' may generate machine learning data DATA_ML by independently processing the raw data DATA_RAW, or may perform sequential machine learning such that the last FPGA FPGA n' can finally generate machine learning data DATA_ML. The memory element 342 may act as an input buffer and an output buffer embedded in each of the FPGAs FPGA 1' to FPGA n'.

In the same manner as in the memory elements of the data storage circuit 310, a plurality of storage regions contained in each of the memory elements 342 may be physically separated from each other. In more detail, each of the memory elements 342 may include a storage region for storing command data DATA_CMD, a storage region for storing location data DATA_LOC, a storage region for storing raw data DATA_RAW, and a storage region for storing machine learning data DATA_ML that are physically distinguished from one another.

The machine learning controller 350 may transmit raw data DATA_RAW stored in the data storage circuit 310 to the memory elements 342, and may transmit machine learning data DATA_ML stored in the memory elements 342 to the data storage circuit 310. That is, the machine learning controller 350 may read raw data DATA_RAW that has been written in the data storage circuit 310 by the host device 100, and may write the read raw data DATA_RAW in the memory elements 342. In addition, the machine learning controller 350 may read machine learning data DATA_ML that has been written in the memory elements 342 by FPGAs FPGA 1' to FPGA n', and may write the read machine learning data DATA_ML in the data storage circuit 310.

In this case, a method for controlling the machine learning controller 350 of FIG. 7 to transmit/receive the raw data DATA_RAW and the machine learning data DATA_ML to/from the host device 100 through the data storage circuit 310 may be identical to the method for controlling the machine learning controller 330 of FIG. 3 to transmit/receive data DATA_RAW and DATA_ML to/from the host device 100 through the data storage circuit 310. In addition, a method for controlling the machine learning controller 350 of FIG. 7 to transmit/receive data DATA_RAW and DATA_ML to/from FPGAs FPGA 1' to FPGA n' through memory elements 342 may be identical to the method for controlling the machine learning controller 330 of FIG. 3 to transmit/receive data DATA_RAW and DATA_ML to/from the host device 100 through the data storage circuit 310. Therefore, a detailed description of the above methods will herein be omitted for convenience of description.

Figure 8:
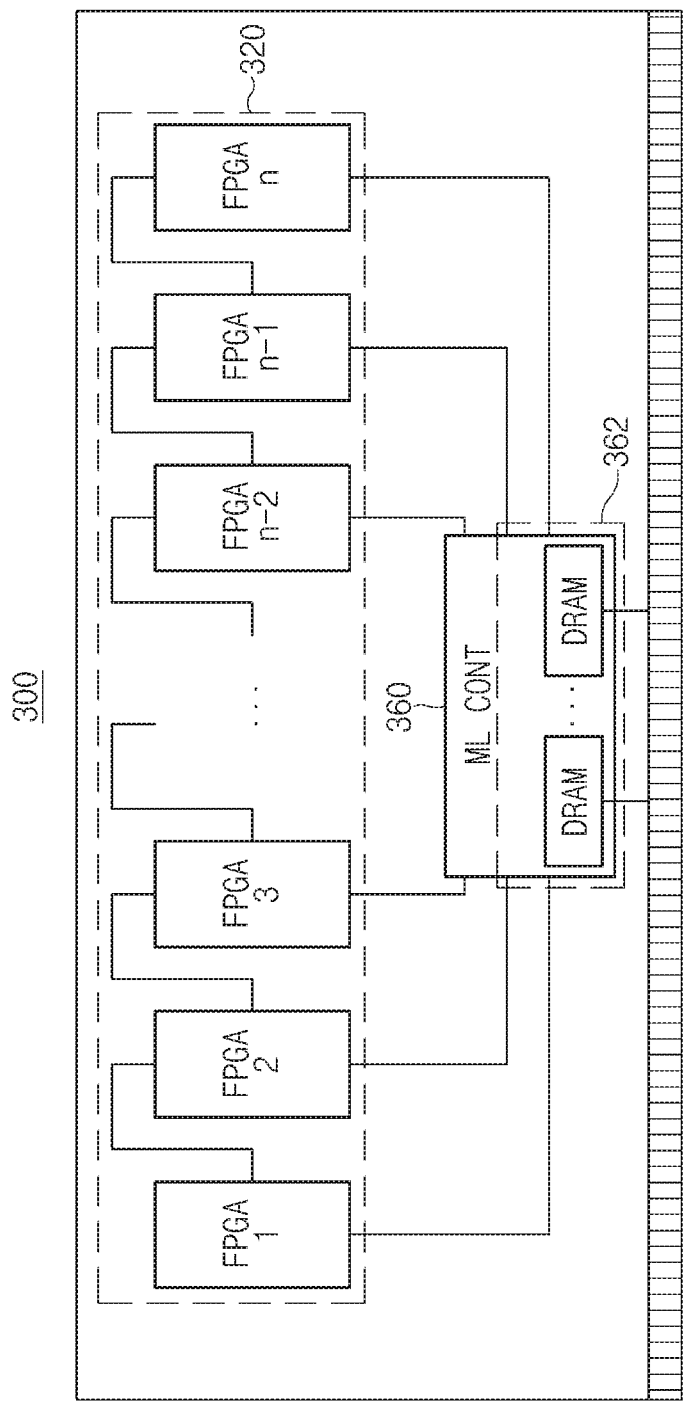
FIG. 8 is a schematic diagram illustrating an example of a machine learning device according to still another embodiment of the present disclosure.

FIG. 8 is a schematic diagram illustrating an example of a machine learning device 300 according to an embodiment of the present disclosure.

Compared to the embodiment of FIG. 3, the embodiment of FIG. 8 includes memory elements 362, corresponding to the data storage circuit 310 of FIG. 3, that are embedded in the machine learning controller 360. Structures and functions of the memory elements 362 are identical to those of other memory elements contained in the data storage circuit 310 of FIG. 3.

Although FIG. 8 illustrates only a modified example of the structure shown in FIG. 3 for convenience of description, it should be noted that memory elements of the data storage circuit 310 of FIG. 7 can also be embedded in the machine learning controller 350 without departing from the scope or spirit of the present disclosure.

As is apparent from the above description, the machine learning device according to the embodiments of the present disclosure may be formed in a general-purpose memory module shape, such that the machine learning device can easily apply a machine learning function to general computers.

Those skilled in the art will appreciate that the embodiments may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment or included as a new claim by a subsequent amendment after the application is filed.

Although a number of illustrative embodiments have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

What is claimed is:

1. A machine learning device comprising:
   a data storage circuit configured to be coupled to a host device directly through a memory module interface, store a raw data and a command data received from the host device through the memory module interface, and store a machine learning data as a result of machine learning of the raw data and a location data of the machine learning data;
   a machine learning logic circuit configured to generate the machine learning data through the machine learning of the raw data according to a pre-programmed machine learning logic; and
   a machine learning controller configured to read the raw data from the data storage circuit based on the command data stored in the data storage circuit, transmit the read raw data to the machine learning logic circuit, and write the machine learning data and the location data in the data storage circuit,
   wherein the machine learning controller communicates with the host device through the data storage circuit.

2. The machine learning device according to claim 1, wherein the data storage circuit is configured to transmit and receive data to and from the host device through a Dual In-line Memory Module (DIMM) interface.

3. The machine learning device according to claim 1,
   wherein the data storage circuit includes a plurality of memory devices, and
   wherein each of the memory devices is configured in a manner that a region for storing the raw data, a region for storing the command data, a region for storing the machine learning data, and a region for storing the location data are predetermined.

4. The machine learning device according to claim 1, wherein the machine learning logic circuit includes a plurality of field programmable gate arrays (FPGAs) in which the machine learning logic is programmed.

5. The machine learning device according to claim 4, wherein each of the FPGAs receives the raw data from the machine learning controller, performs machine learning, and transmits the machine learning data to the machine learning controller, independently.

6. The machine learning device according to claim 4, wherein the plurality of FPGAs are configured to sequentially perform the machine learning logic such that a last one of the final FPGAs transmits the machine learning data to the machine learning controller.

7. The machine learning device according to claim 4, wherein each of the FPGAs includes:
   an input buffer configured to store the raw data received from the machine learning controller;
   an output buffer configured to store the machine learning data; and
   a logic circuit in which the machine learning logic is programmed, configured to process the raw data stored in the input buffer according to a programming logic, and output the processed raw data to the output buffer.

8. The machine learning device according to claim 4, wherein the machine learning logic circuit further includes a plurality of memory elements respectively corresponding to the plurality of FPGAs, and configured to temporarily store the raw data and the machine learning data transferred between the machine learning controller and the plurality of FPGAs.

9. The machine learning device according to claim 1, wherein the machine learning controller is configured to periodically monitor whether the command data is stored in a predetermined region of the data storage circuit, read the raw data from the data storage circuit based on the command data, and transmit the read raw data to the machine learning logic circuit.

10. The machine learning device according to claim 9, wherein the machine learning controller is configured to store the machine learning data in the data storage circuit, and store in the predetermined region of the data storage circuit the location data indicating a storage location of the machine learning data.

11. The machine learning device according to claim 1, wherein the machine learning controller is configured to store the machine learning data in the data storage circuit, and store in a predetermined region of the data storage circuit the location data indicating a storage location of the machine learning data.

12. The machine learning device according to claim 1, wherein the data storage circuit is embedded in the machine learning controller.

13. A machine learning system comprising:
a host device configured to include one or more processors; and
a machine learning device configured to generate a machine learning data by performing machine learning of a raw data received together with a write command from the host device according to a pre-programmed machine learning logic, and transmit the machine learning data to the host device upon receiving a read command from the host device,
wherein the machine learning device includes:
a plurality of chip pins through which the machine learning device is connectable to a computer motherboard;
a data storage circuit configured to be coupled to host device directly through the plurality of chip pins, and receive the raw data and the write command from the host device and transmit the machine learning data to the host device directly through the plurality of chip pins;
a machine learning logic circuit configured to generate the machine learning data using the raw data stored in the data storage circuit; and
a machine learning controller configured to read the raw data from the data storage circuit, transmit the read raw data to the machine learning logic circuit, and write the machine learning data in the data storage circuit, and
wherein the machine learning controller communicates with the host device through the data storage circuit.

14. The machine learning system according to claim 13, wherein the machine learning device is formed in a shape of a memory module based on a Dual In-line Memory Module (DIMM) standard.

15. The machine learning system according to claim 13, wherein the host device is configured to write the raw data and command data in the data storage circuit using a write command and first address information, and read the machine learning data stored in the data storage circuit using a read command and second address information.

16. The machine learning system according to claim 13, wherein the host device is configured to periodically monitor a predetermined region of the data storage circuit to determine whether the machine learning data is stored in the data storage circuit based on a result of the monitoring.

17. The machine learning system according to claim 13, wherein the machine learning logic circuit includes a plurality of field programmable gate arrays (FPGAs) in which the machine learning logic is programmed.

18. The machine learning system according to claim 17, wherein each of the FPGAs includes:
an input buffer configured to store the raw data received from the machine learning controller;
an output buffer configured to store the machine learning data; and
a logic circuit in which the machine learning logic is programmed, configured to perform machine learning of the raw data stored in the input buffer according to a programming logic, and output the processed raw data to the output buffer.

19. The machine learning system according to claim 13, wherein the data storage circuit is embedded in the machine learning controller.

* * * * *